United States Patent [19]
Sumino

[11] Patent Number: 4,552,653
[45] Date of Patent: Nov. 12, 1985

[54] REAR DUMP TRUCK WITH SIEVING DEVICE

[76] Inventor: Shin Sumino, Sukaihaitsu Tokai 2310, 1-13 Tomiyacho, Kanagawa-ku, Yokohama-shi, Kanagawa-ken, Japan

[21] Appl. No.: 602,472

[22] Filed: Apr. 20, 1984

[30] Foreign Application Priority Data

Apr. 22, 1983 [JP] Japan .................................. 58-70144

[51] Int. Cl.[4] ................................................ B07B 1/28
[52] U.S. Cl. .................................... 209/421; 209/254; 209/260; 209/267; 414/469; 298/7
[58] Field of Search .............. 209/421, 267, 260, 247, 209/254, 420; 298/7, 8 R; 414/467, 469

[56] References Cited

U.S. PATENT DOCUMENTS 4,256,572  3/1981  Read ................................ 209/420 X

FOREIGN PATENT DOCUMENTS 58-58245  12/1983  Japan .

Primary Examiner—Frank W. Lutter
Assistant Examiner—Thomas M. Lithgow
Attorney, Agent, or Firm—Fleit, Jacobson, Cohn & Price

[57] ABSTRACT

A rear dump truck for transporting particulate material and simultaneously discharging and sieving the material. The rear dump truck includes a load box divided into a front section and a rear section by a partition dump door. The front section of the box forms a load chamber space for carrying the particulate material and the rear section forms a load chamber space including wire sieves for sieving purposes. To adjust the flow rate of the particulate material passing from the front section into the rear section through below the partition dump door upon the tilting up of the box, a stopper which is tiltable by a hydraulic jack is positioned just before the partition dump door. The particulate material is supplied in a suitable amount at a given time through the adjustment of the tilting of the stopper and passes onto the wire sieves. The material is sieved and the sieved particles are discharged through rear dump doors according to the particle sizes.

9 Claims, 1 Drawing Figure

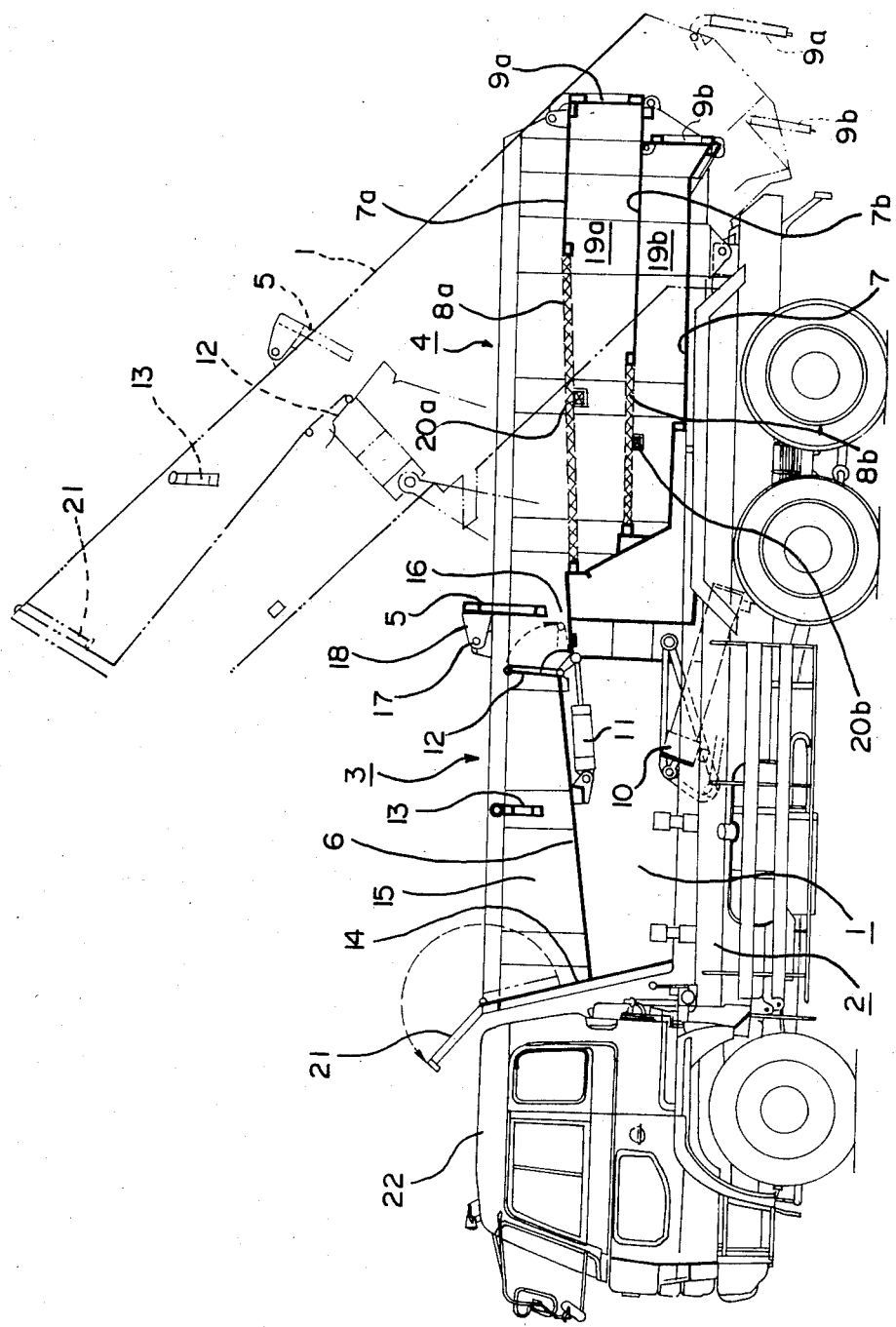

REAR DUMP TRUCK WITH SIEVING DEVICE

BACKGROUND OF THE INVENTION

The present invention relates to a rear dump truck with a sieving device which is designed so that when particulate matter including dust and fine particles are loaded, transported and unloaded, upon the unloading the box is tilted up so that the dust and fine particles included in the loaded matter are sifted out and discharged through separate dump doors.

Generally, particulate matter such as ferroalloys, e.g., silicon manganese, ferro silicon and ferrochrome alloys, coke and coal mostly includes homogeneous particulate dust and fine particles from the start of their production. When such material is supplied as a commercial product to a user or as a raw material to another plant, the material is delivered after removing the particulate dust and fine particles through a sieving operation. In the past, it has been the usual practice to effect the sieving of the material delivered by a dump truck by a separate sieving machine installed as a stationary equipment. However, this gives rise to a disadvantage of the sieving operation requiring not only a site and equipment but also a considerable labor and there are another problems of environmental contamination due to the scattering of the particulate dust, etc.

In view of these circumstances, the inventor has already proposed a rear dump truck with a sieving means which eliminates the sieving operation and is capable of effecting the sieving during the discharging of the material or the final stage of the transportation of the material by the dump truck. The details of this dump truck are disclosed in Japanese Laid-Open Patent Application Publication No. 56-28025 published on Mar. 19, 1981 or its issued patent, i.e., Japanese Patent Publication No. 58-58245 (Published on Dec. 24, 1983). The disclosed rear dump truck is so designed that any particulate material requiring sieving can be carried and both the sieving and the discharging of the material can be effected simultaneously by tilting up the box upon the dumping. Also, in case of particulate material containing a large quantity of finely divided particles, there is no danger of the sieved particulate material from being mixed with the minus sieve or undersize fine particles when the box is tilted up. Then, in the case of particulate material of such properties tending to cause solidification of the material, from the standpoint of simplication of the box tilting operation effected by the driver himself and ensuring excellent sieving result at all times, it is absolutely necessary in many cases that during the dumping the tilting up of the box does not cause the particulate material to slide down altogether but allows suitably restrained down flow of the material while stirring the top and bottom layers thereof thus ensuring the uniform sieving of the material. While the rear dump truck disclosed in the publications is provided with the necessary means for this purpose, the means merely comprises a plurality of ridges fixedly arranged on the box floor in the width direction thereof and therefore the means is not sufficient for preventing the occurrence of an avalanche phenomenon of the particulate material due to the tilting up of the box upon the dumping, thus imposing on the operator a complicated task of suitably adjusting the tilting speed of the box, for example.

SUMMARY OF THE INVENTION

With a view to overcoming the foregoing deficiencies in the prior art, it is the primary object of the present invention to provide an improved rear dump truck of the type requiring no exclusive place and fixed equipment for the sieving operation but capable of simultaneously effecting the transport and sieving of material, and which is so adjustable that during the dumping the siever is supplied with a suitable amount of particulate material at a given time, thus preventing the occurrence of any avalanche phenomenon without any complication of the tilting operation of the box.

In accordance with one embodiment of the invention, a rear dump truck includes: a tiltable box having a floor whose three sides are enclosed with a front vertical plate and two side vertical plates and rear dump doors or gates attached to the remaining side of the floor so as to be opened and closed and lockable in the closed position; a partition dump door having its upper ends pivoted to the box side vertical plates centrally in the box and its lower edge arranged to form a gap between it and the floor thereby dividing the interior of the box into front and rear sections; wire sieves each horizontally stretched at an intermediate height position within the box rear section; an undersize chamber formed as a part of the box below each wired sieve and having its rear side closed by one of the rear dump doors adapted to be opened and closed and lockable in the closed position; and a stopper positioned on the floor just before the partition dump door within the box front section and adapted to be tilted up by a hydraulic jack such that its height in the tilted position is lower than the side vertical plates of the box.

The above and other objects as well as advantageous features of the invention will become more clear from the following description taken in conjunction with the drawing.

BRIEF DESCRIPTION OF THE DRAWING

The single FIGURE drawing is a side view of an embodiment of the invention showing a box portion in section schematically.

DESCRIPTION OF THE PREFERRED EMBODIMENT

A rear dump truck with a sieving device according to the invention will now be described with reference to the illustrated embodiment.

In the drawing, numeral 1 designates a load box which is tiltable through the operation of a box tilting hydraulic jack unit 10 mounted on a chassis 2. The box 1 includes floors 6 and 7 whose three sides are enclosed with a front vertical plate 14 and left and right side vertical plates 15 (only the right side vertical plate 15 is shown) and rear dump doors 9a and 9b are attached to the remaining side or the rear side of the floor 7. Arranged centrally within the box 1 is a partition dump door 5 having its upper ends pivoted to the side vertical plates 15 and its lower edge positioned to form a gap 16 between it and the floor 6. The partition dump door 5 divides the interior of the box 1 into a front section 3 serving as a space for receiving loaded particulate material and a rear section 4 serving as a space for sieving the particulate material during the dumping. The partition dump door 5 is dependently attached to the outer ends of arms 18 that extend rearwardly from pivot portions 17 on the side vertical plates 15, so that the arms 18 are pivotable about the pivot portions 17 and they are lockable in any given moved position. Also, the height of the partition dump door 5 is higher than that of the side vertical plates 15 and the load in the front section 3 is prevented from escaping and falling into the rear section 4 by locking the dump door 5 in a vertical position.

The floor 6 is provided for the front section 3 and in the illustrated embodiment the floor 6 is inclined forwardly so as to increase the loading space in depth toward the front in the vehicle lengthwise direction. The floor 7 is provided for the rear section 4 and two wired sieves 8a and 8b are horizontally stretched and arranged one upon another at intermediate vertical positions within the rear section 4. The rear portions of the seives 8a and 8b are respectively closed by partition floors 7a and 7b and thus first and second undersize chambers 19a and 19b are formed. The rear portion of the first chamber 19a is divided so as to be opened and closed by the rear dump door 9a and the second chamber 19b is divided so as to be opened and closed by the rear dump door 9b. These rear dump doors 9a and 9b are the same and are of the ordinary type which can be locked and released by means of latches, or the like, manually or through remote control. It is needless to say that the lower wire sieve 8b is smaller in mesh size than the upper wire sieve 8a. Also, while in the illustrated embodiment, the box rear end above the partition floor 7a is opened, this portion may also be provided with a rear dump door. Mounted at a position lying toward the rear within the box front section 3 or a position just before the partition dump door 5 is a stopper 12 which is tiltable from the floor 6. The stopper 12 is tilted up by a hydraulic jack 11 mounted on the back side of the floor 6 and the height of the stopper 12 in the tilt-up position is lower than the upper edge of the side vertical plates 15.

The stopper 12 is provided to serve the principal function such that during unloading the amount of tilting is adjusted so as to prevent the particulate material from causing an avalanche phenomenon in one breadth, and thereby adjust the amount of unloaded material passing into the rear section 4 through the gap 16 below the partition dump door 5. Also, by suitably controlling the rotational position of the partition dump door 5 and locking it in this position, it is possible to adjust the opening of the gap 16 and effectively adjust, along with the stopper 12, the flow rate of the material.

Numeral 13 designates a baffle plate having its upper portion pivoted to the side plates 15 in the front section 4 of the box 1 and it may be provided with lock means for adjusting the fixed angle so that during dumping the baffle plate 13 is locked in a vertical position as occasion demands so as to prevent the particulate material from flowing down rapidly and it also shares a portion of the weight of the load borne by the stopper 12, thus functioning as a box reinforcing element. Also, the baffle plate 13 may simply comprise a pipe arranged to extend in the width direction of the box 1.

The wire sieves 8a and 8b are substantially horizontally arranged within the rear section 4 and each of them should preferably be fixed in position so as to be replaceable with sieves of different mesh sizes. Also, the upper wire sieve 8a is greater in external area than the lower wire sieve 8b and thus the lower wire sieve 8b can be removed through the opening formed by the removal of the upper wire sieve 8a. Also, it is needless to say that the lower wire sieve 8b is smaller in mesh size than the upper wire sieve 8a and it is suitably changed with sieves of 10 to 80 mm, for example, for different types of material and purposes. While, in this embodiment, two wire sieves are arranged one upon another, it is of course possible to arrange two or more wire sieves. Further, the width of the wire sieves 8a and 8b must be selected substantially equal to the inside measurement of the box in the width direction of the vehicle, and also their length in the vehicle's lengthwise direction must be selected such that upon dumping the particulate material is filtered and sieved completely in a short period of time as the box is tilted. Still further, as will be seen from the drawing, the wire sieves 8a and 8b are arranged toward the front in the lengthwise direction of the vehicle so that each of the partition floors 7a and 7b of the rear section 4 has a relatively wide area as the rear floor in the vehicle's lengthwise direction. From the constructional point of view this has an important function so that the sieved fine particles are retained in the rear portions of the resulting chambers 9a and 9b and the particles sieved according to different particle sizes are separately discharged to the outside of the vehicle as the top rear dump door (not shown), the first undersize dump door 9a and the second undersize dump door 9b are opened successively.

Also, it is of course possible to couple the locking means of the respective dump doors to the circuits of a hydraulic or air pressure system and thereby effect the opening and closing operation of the dump doors and the stopper 12 from a single definite place. Still further, one or both of the wire sieves 8a and 8b may be provided with low-period pulsation vibrators 20a and 20b of the type which produces intermittent vibrations at a period for example of 1 to 3 seconds thus efficiently performing the sieving operation.

Still further, an extension plate 21 may be foldably attached to the upper edge of the front vertical plate 14 to protect a roof 22 of the driver's seat during the discharging of the particulate material from a payloader into the box front section 3, and the extension plate 21 may be folded if it strikes against the eaves of a warehouse building as the box is tilted up. In the drawing, the tiltup position of the box 1 is shown by a dot-and-dash line.

Next, the operation of loading and unloading particulate material will be described. The particulate material is first loaded only into the front section 3 of the box 1 or in the front of the partition dump door 5. Therefore, a consideration should preferably be given so that the front part of the box 1 has a greater depth so as to permit the loading of a sufficient amount of the material and the length of the box 1 in the vehicle's lengthwise direction is made long as compared with the ordinary one. Then, during the unloading at the destination the partition dump door 5 is rotated to open the gap 16 and the stopper 12 is tilted to a suitable angle through the operation of the hydraulic unit 11. Then, the box tilting dumper is operated and the box is tilted to an angle of about 50°. During the interval, the tilting of the stopper 12 is adjusted by the jack 11 in such a manner that the particulate material is prevented from causing an avalanche phenomenon or simultaneous discharging but it is allowed to always flow in the form of a single layer. In this case, the baffle plate 13 may be rotated as occasion demands so as to effectively contribute to the above-mentioned adjustment. To cause the particulate material to flow as a single layer of the uniform thickness before passing to the wire sieves 8a and 8b has the effect of ensuring the effect of the invention. Also, while the floors 7a and 7b in the rear of the wire sieves 8a and 8b have no direct bearing on the sieving, they serve as the partitions of the undersize chambers 19a and 19b, have the effect of preventing the sieved particles from being mixed as they are discharged by the opening of the undersize chambers 19a and 19b to the outside of the vehicle and perform the function of preventing any overflowing.

The rear dump truck with a sieving device according to the invention is capable of simultaneously transporting and sieving particulate material including dust and fine particles which has heretofore been transported separately from the sieving operation. Thus, the rear dump truck with a sieving device provided in accordance with the invention serves both a transportation function and a sieving function, which eliminate the equipment and labor for the sieving operation and therefore the present invention makes great industrial contributions.

What is claimed is:

1. A rear dump truck comprising:
    a tiltable load box including a floor, a front plate and a pair of side plates;
    a partition dump door pivotably carried by said load box defining a gap between a lower edge portion thereof and the floor and dividing the box into a front section and a rear section, said partition dump door being lockable in a plurality of predetermined pivotal positions;
    sieve means extended substantially horizontally at an intermediate height position within the box rear section;
    a load chamber forming a part of the box below the sieve means;
    rear dump door means attached to the load chamber; and
    a stopper pivotably mounted on the floor of the front section at a position forward of the partition dump door in this box, locking means for locking said stopper in a predetermined pivotal position, the stopper being pivotable between a first position adjacent the floor of the box and a second, upright position relative to the floor of the box, the height of the stopper in the second position being lower than that of the side plates of the box.

2. A truck according to claim 1 wherein the partition dump door is pivotably carried by the side plates.

3. A truck according to claim 1 wherein the truck includes a hydraulic jack and the stopper is pivotable by the hydraulic jack and is lockable thereby in a plurality of pivotal positions.

4. A truck according to claim 1 further comprising baffle means extending between upper parts of the side plates at a position between the front plate and the partition dump door.

5. A truck according to claim 1 wherein the floor is inclined in the front section to increase the height of the box toward the front of the truck.

6. A truck according to claim 1 wherein the sieve means comprises a first sieve means and a second sieve means spaced from and below the first sieve means, the load chamber comprising an upper chamber and a lower chamber divided from each other by the second sieve means, and rear dump doors attached to a rear part of each of the upper and lower chambers.

7. A truck according to claim 6 wherein the sieve means is removable, the second sieve means being smaller in area than the first sieve means and of a finer mesh than the first sieve means.

8. A truck according to claim 1 further comprising a driver's cab having a roof, and a movable extension plate attached to the front plate of the box and which is movable to at least partially cover and protect the roof of the cab of the truck.

9. A truck according to claim 1 wherein the sieve means include vibrator means for causing pulsating vibrations of the sieve means.

* * * * *